July 21, 1959 R. H. KUHLMEIER 2,895,309
REFRIGERATION EQUIPMENT FOR INSULATED TRUCKS AND VEHICLES
Filed May 6, 1957 4 Sheets-Sheet 1

INVENTOR
Robert H. Kuhlmeier

July 21, 1959  R. H. KUHLMEIER  2,895,309
REFRIGERATION EQUIPMENT FOR INSULATED TRUCKS AND VEHICLES
Filed May 6, 1957  4 Sheets-Sheet 2
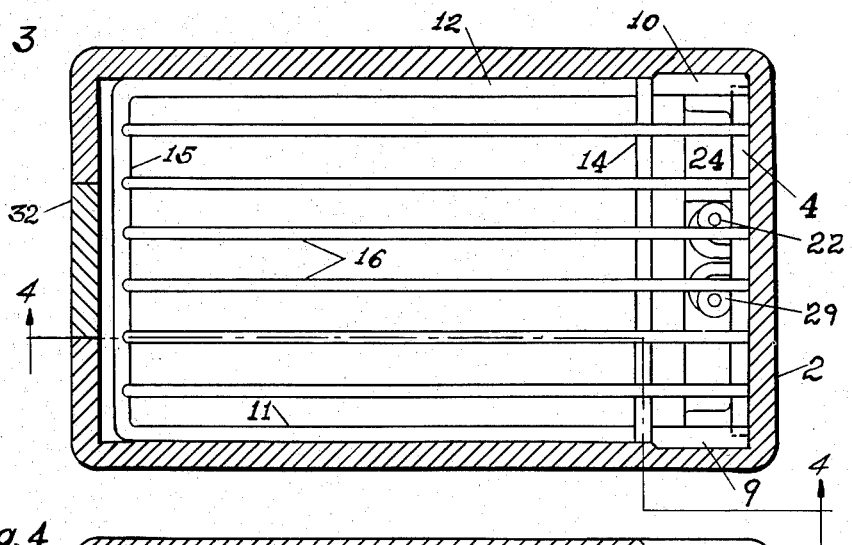
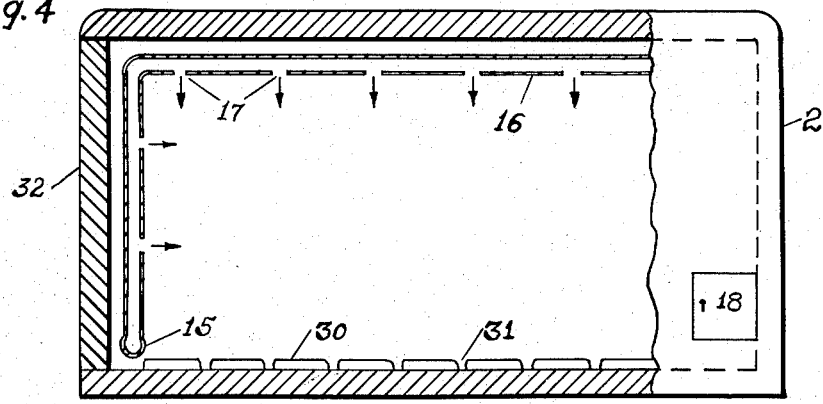
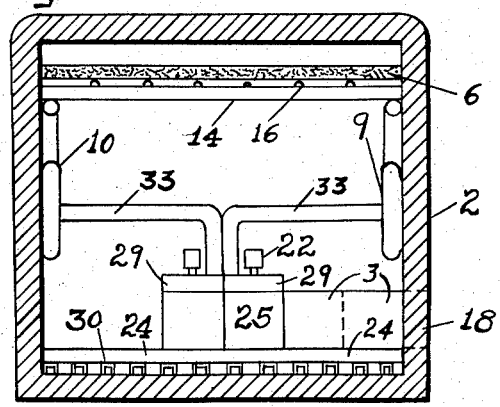
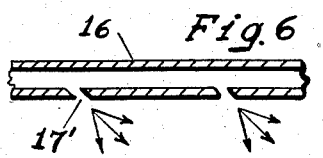
INVENTOR
Robert H. Kuhlmeier

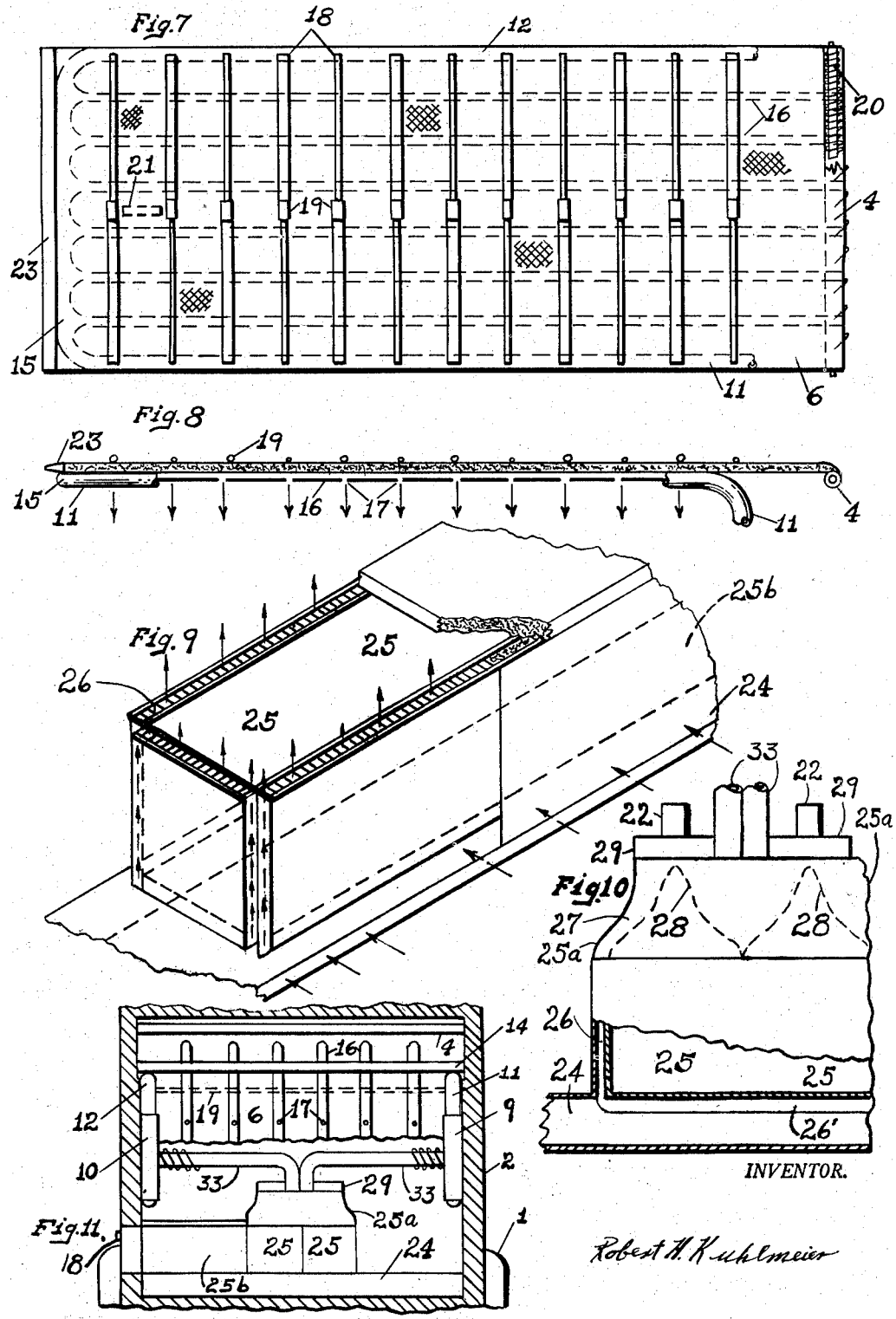

July 21, 1959 R. H. KUHLMEIER 2,895,309
REFRIGERATION EQUIPMENT FOR INSULATED TRUCKS AND VEHICLES
Filed May 6, 1957 4 Sheets-Sheet 4
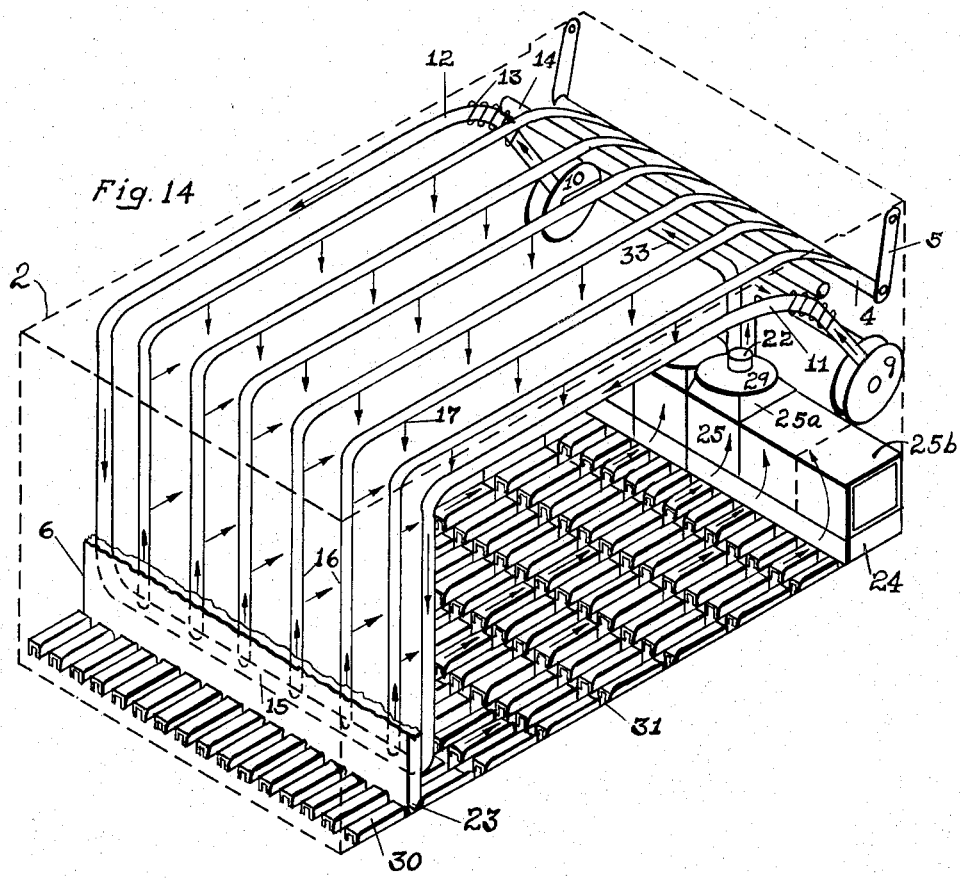
INVENTOR
Robert H. Kuhlmeier United States Patent Office 2,895,309
Patented July 21, 1959

2,895,309

REFRIGERATION EQUIPMENT FOR INSULATED TRUCKS AND VEHICLES

Robert H. Kuhlmeier, Rockford, Ill.

Application May 6, 1957, Serial No. 657,237

27 Claims. (Cl. 62—186)

This invention relates to a method of truck refrigeration and more particularly to a means of refrigerating only that portion of a truck or vehicle where the load is located.

In transporting perishable foodstuffs or other materials that require refrigeration the entire volume of the inside of the vehicle is often kept cold. Because of variation in closeness of stacking of the materials, a truck's volume will often not be filled to anywhere near capacity; yet, it may be filled to its licensed weight limit and the remaining sizeable unused volume within the truck is still refrigerated. When a truck starts from its source, it is usually full. During its travel, as deliveries are made, the load diminishes; yet, heretofore, the cost of refrigeration remained constant.

The objects of my invention are: firstly, to improve the efficiency of said vehicles by decreasing the volume to be cooled as the load decreases. By so doing, I economize on the cost of refrigeration as well as improve the cooling of the remaining load, whether Dry Ice or some other form of refrigeration is employed.

A further object is to better distribute and circulate the frigid refrigerant air over the material, and another object is to do this in a way which will increase the convenience of loading and unloading material from a refrigerated truck.

Broadly, I accomplish these objects and others by employing a unique combination of rollable blanket and rollable tubing, which work in conjunction with a blower and cooling system to the end set forth above. In the drawings and description, like reference numerals refer to like parts and:

Figure 3 is a cross-sectional view taken on line 3—3 of Figure 1, between the blanket and the tubing, showing the inlet and the outlet flexible tubing arrangement.

Figure 4 is a fragmentary cross-sectional elevation taken on line 4—4 of Figure 3, showing the outlet ports in the outlet flexible tubing.

Figure 5 is a vertical section on line 5—5 of Figure 1 with load 8 removed.

Figure 6 is a fragmentary enlarged cross-section of one of the outlet tubes showing exhaust ports.

Figure 7 is a plan view of the freezer blanket unrolled, showing the blanket ribs. Also, in broken lines, are shown the manifold, and the inlet and outlet tubes.

Figure 8 is a side elevation of the blanket showing blanket ribs, inlet and outlet tubes, and manifold.

Figure 9 is an isometric view of the air plenum showing the finned sides on the Dry Ice chamber and the route of air travel to produce a maximum conduction, radiation, and convection effect.

Figure 10 is a partially cut-away side elevation of the Dry Ice chamber of Figure 9 showing the lid of the Dry Ice chamber and the blower and blower motor.

Figure 11 is a vertical section on line 11—11 of Figure 1.

Figure 12 is a fragmentary detailed drawing of the manifold showing inlet and outlet tubes and the manifold.

Figure 13 is a sectional detail of the manifold on line 13—13 of Figure 12.

Figure 14 is an isometric phantom view of the interior of the truck body showing how the blanket seals itself into the lateral floor slots, and also showing the flow of air through the entire system.

Figure 1:
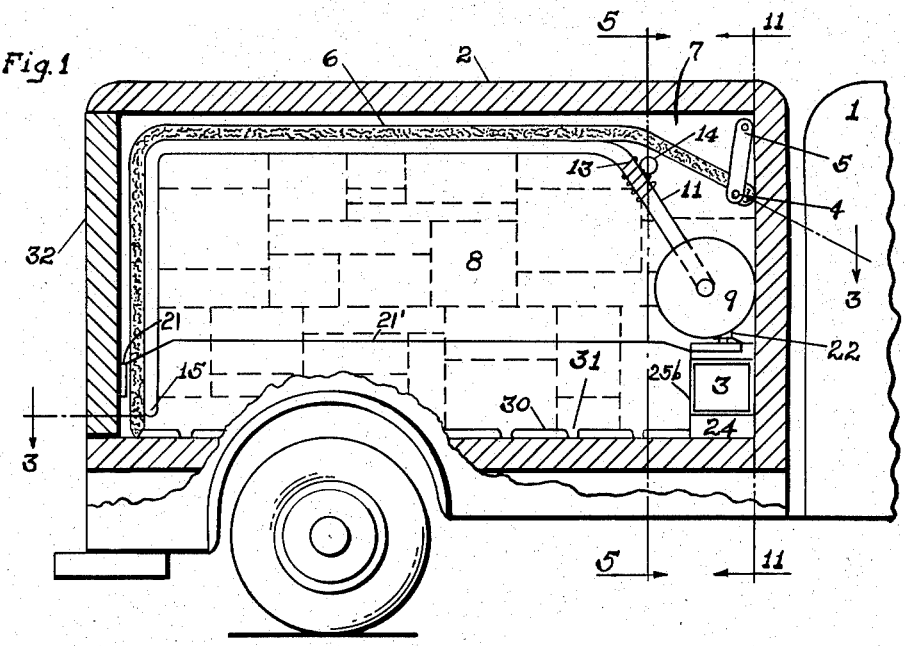
Figure 1 is a partially cut away view in side elevation of one embodiment of my invention, installed in an insulated vehicle body mounted on a truck shown with a relatively full pay load.
Figure 2:
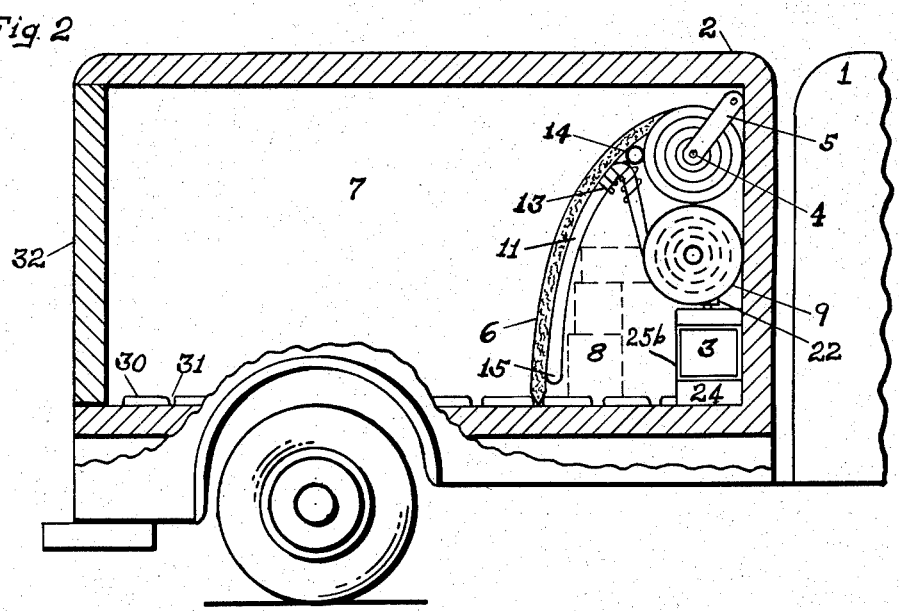
Figure 2 is a view similar to Figure 1 showing a small pay load.

Referring now to Figures 1 and 2, there is shown a truck 1 having an insulated body 2 mounted thereon which is to be refrigerated, in this instance by Dry Ice 3. The body 2 is adapted to be loaded and unloaded from the rear end, where a door 32 is indicated. Also, there is shown at the closed front end a roller 4 supported by swingable arms 5. The roller is suported in this way so that the changing diameter of the roller plus the freezer blanket 6 is accommodated automatically as the blanket is rolled up. The blanket will always be tangent to and in contact with the front wall of the body, thus sealing out any unrefrigerated air in the outer space 7. The pay load 8 in Figure 1 is shown relatively full while in Figure 2 the pay load 8 is small. Also, in Figures 1 and 2 is shown reel 9. Inlet tubing 11 extending along one side wall of the truck body is wound on reel 9, and inlet tubing 12 extending along the other side wall is wound on reel 10 located on the other side wall of the truck body, as shown in Figure 3.

Reels 9 and 10 are secured to the side walls of the truck body, and their axes are fixed and do not shift like the axis of roller 4. The inlet flexible tubing 11 and 12 is reeled in and out on reels 9 and 10 in accordance with the reeling onto and off of the roller 4 of the freezer blanket 6. Coiled spring guards 13 are also shown to guide the inlet tubes 11 and 12 and protect the same against kinking when bent sharply. A crossbar 14 is shown to separate the inlet tubes from the freezer blanket and also form an abutment for springs 13. A further function of the crossbar is to guard the roller 4 from any sudden shifting of load 8 forward. The roller 4 is of a torsion spring type, like a window shade roller, while the springs in the reels 9 and 10 are of a clock or power type.

In Figure 3, inlet tubes 11 and 12 are shown unreeled from reels 9 and 10 and passed under crossbar 14, the rear ends of the tubes being connected with the opposite ends of manifold 15. From manifold 15, outlet tubes 16 extend forwardly the length of the truck body. The outlet tubes and the blanket both terminate on roller 4 and are thus adapted to be rolled up together. Both the inlet and outlet flexible tubing are items available on the open market. It is important to select tubing that will remain flexible at cold temperatures. The outlet tubes 16 travel over the crossbar 14 which helps to flatten them so that the cold air will not be passing through that portion of the tubes already rolled up on roller 4. The inlet tubes 11 and 12 are never flattened.

In Figure 4, which is a fragmentary cross-sectional view taken on line 4—4 of Figure 3, the outlet tubes 16 are shown with cold air, represented by arrows, being emitted from ports 17. At 18 is shown an exterior Dry Ice inlet door on one side of body 2 at the front end.

Figure 5 illustrates a design having the outlet tubes 16 on top of the crossbar 14 and the inlet tubes 11 and 12 underneath the crossbar. The weight of the blanket will also tend to flatten the outlet tubes while contacting the crossbar, thus restricting any emission of cold air in that portion of the outlet tubes being rolled with the blanket onto the roller 4. The outlet tubes 16 are illustrated in a semiflattened condition.

Figure 6 is an enlargement of a section of one of the outlet tubes 16 and shows an optional design of exhaust ports 17' in the walls of said tube at approximately 30 degree angles. This will help to close the ports when the tubes are wound around roller 4 as shown in Figure 2.

Figure 7 is a plan view of the freezer blanket 6. On the top side are shown ribs 18, which are small telescoping metal tubes that slide within each other and are secured at their outer ends to the edges of the blanket, the tubes having springs 19 urging the same outwardly in opposite directions, thus keeping the blanket square and its edges parallel at all times to and in contact with the side walls of the truck body 2. These ribs could also be stationary and without the springs 19. Also, roller 4 is shown and a partial cross-section of roller 4, showing torsion spring 20. A thermostat 21 is shown on the underneath side of the blanket and it is suitably connected electrically with the blower motor 22 of Figure 10, as indicated diagrammatically by line 21' in Fig. 1. A rubber seal 23 is located at the trailing edge of the freezer blanket.

Figure 8 represents a side elevation of the freezer blanket 6 showing inlet tube 11, manifold 15, outlet tubes 16, and exhaust ports 17. The arrows represent cold air being emitted from the outlet tubes.

Figure 9 is an isometric design of the air plenum chamber 24 and one of the two Dry Ice chambers 25, and the arrows show air movement from the air plenum to the Dry Ice chambers. The air is directed upwardly between fins 26 along the sides of the cubes of Dry Ice in chambers 25, after flowing through the plenum chamber across the bottoms of the chambers 25, where other fins 26' are provided mainly projecting downwardly in the plenum chamber for heat exchange purposes. The fins 26, like fins 26', channel the air and increase the surface area and rate of heat exchange between the air and the Dry Ice. The cubes of Dry Ice are supplied through the opening at door 18, which opens into the lateral extension 25b of chambers 25, the cubes of Dry Ice being slid through the extension 25b into the two chambers 25 from the open end of the one chamber 25 that is accessible when door 18 is opened.

Figure 10 illustrates the two Dry Ice chambers 25, showing the hoods or tops 25a in the hollow walls of each of which are provided a continuation or extension 27 of the air plenum chamber 24 and a central air distributor dome 28. 29 is a centrifugal type blower over each hood 25a, and 22 is the drive motor. Therefore, air distributor domes 28 are designed so that the air flowing through the assembly of Figure 10 maintains the heat exchange with the Dry Ice at a maximum while it is sublimating and reducing in size, thus increasing the rate of refrigeration.

In Figure 11, roller 4 has been swung upwardly with its supporting arms 5 farther towards the ceiling to give a better view.

Figure 12 shows a detailed view of one form of the manifold 15, and Figure 13 is a sectional detail on line 13—13 of Figure 12.

Finally, in Figure 14, there is an isometric phantom view of the entire structure with the blanket 6 broken away to enable better illustration of various details. The floor ribs 30 are shown to be hollow and spaced so air can be drawn through as well as around and between them. This view represents the blanket 6 disposed as for almost a full pay load. It will be noted how the extreme end of the freezer blanket 6 has a good seal in the lateral slots 31 between ribs 30. Also, that these lateral slots 31 will allow lateral circulation of air relative to the load.

In operation, the blanket 6 is pulled out to cover whatever load there is and it lies on top of the load and extends down over the rear portion thereof into the closest available slot 31, so that the enclosed load space to be refrigerated is kept to a minimum. Air is drawn by blowers 29 through the hollow floor ribs 30 into air plenum 24 and is cooled by Dry Ice in the chamber 25 and plenum chamber 24. Cubes of Dry Ice are supplied to chambers 25 through the opening for door 18, the cubes being slidable into chambers 25 through extensions 25b from the door opening. Circulation of air is accomplished by the centrifugal type blowers 29. The air passes from these blowers through tubes 33 into the front ends of the inlet tubes 11 and 12 which are shown reeled out from reels 9 and 10. From these inlet tubes, the air flows into the opposite ends of manifold 15. From the manifold 15, the air enters outlet tubes 16 which extend the entire length of the truck and terminate at and wind on roller 4. From outlet tubes 16, cooled air is exhausted through ports 17 (or 17'), thus circulating a freezing mist of cold air only into and through that portion of the truck body containing the pay load. Door 18 is opened to replenish the supply of Dry Ice, the cubes sliding on top of plenum chamber 24 to chamber 25.

The above description is for the most part relative to a medium sized truck. While the Dry Ice sublimates, the $CO_2$ gas can either be blown through the entire system or, in the Dry Ice chamber 25, a small port could be provided in the bottom to exhaust the gas to the exterior of the truck body.

Other mechanical means of refrigeration could also be used in this system instead of Dry Ice. Everything disclosed would be very much the same except the Dry Ice chamber 25 and the door 18 would be eliminated.

For a more simplified system to be used in smaller trucks that would have access to their base of operations for additional supplies of Dry Ice the following variation is also contemplated: the Dry Ice will be scattered in small pieces on the top of load 8, and the freezer blanket and roller and separator bar will also be used, but all of the tubing and the Dry Ice chamber and air plenum will be omitted. The cold air and $CO_2$ gas sublimating from the particles of Dry Ice will travel in a downward direction thus cooling the contents of the pay load. As the load diminishes in size the roller will accordingly be rolled up; thus, the blanket will separate the unrefrigerated air 7 from the refrigerated section where the pay load is located.

Another variation contemplated is the use of this system in a large semi-trailer truck. Because of the length of the truck, more than one roller and blanket combination might be necessary. Thus, in this variation, a series of rollers and air plenums and tubing would be called for which would run the entire length of the said truck body. However, the rollers could all be stationary with no moving supporting arms 5 except the roller closest to the front wall of the truck body.

The operation of this invention will be understood from the foregoing description of the details thereof, taken in connection with the above recited objects and drawings. Further description would, therefore, appear to be unnecessary.

Minor modifications of the invention, varying in minor details from the embodiment illustrated and described here, may be resorted to without departure from the spirit and scope of this invention, as defined in the appended claims.

Having described the invention, what is claimed as new is:

I claim:

1. A refrigerating chamber having a floor and surrounding walls and a service door at one end, a single flexible blanket of insulating material reaching the full width of said chamber extensible substantially horizontally from the other end of said chamber toward the door end so as to be held by gravity in more or less close relationship to the top of the material to be refrigerated, said blanket also extending down behind said material to the floor, whereby closely to enclose whatever material is present to be refrigerated and thereby enclose only a fraction of the total volume of the chamber which diminishes as material is removed and the blanket is shifted accordingly, refrigeration means for the blanket enclosed portion of said chamber, and means in the end of said chamber remote from the service door for drawing air from the lower portion of said blanket enclosed space continuously into cooling contact with said refrigeration means and discharging the cooled air into the upper portion of said blanket enclosed space, whereby to confine the cold aid circulation to the blanket-enclosed space and keep all of the material enclosed by the blanket refrigerated.

2. A refrigerator chamber having surrounding walls and a service door at one end, a flexible blanket of insulating material reaching the full width of said chamber extensible from the other end of said chamber toward the door end closely to enclose whatever material is present to be refrigerated and thereby enclosed only a fraction of the total volume of the chamber which diminishes as material is removed and the blanket is shifted accordingly, refrigeration means for the blanket-enclosed portion of said chamber, and means for drawing air from the lower portion of said blanket-enclosed space continuously into cooling contact with said refrigeration means and discharging the cooled air into the upper portion of said blanket-enclosed space, said chamber having a floor with transversely extending slots provided therein in longitudinally spaced relation into any one of which closest to the material the outer end of said blanket is adapted to be entered to seal the blanket enclosed space, and slots in the floor extending longitudinally thereof and communicating with the transversely extending slots.

3. A refrigerator chamber having a floor and surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, refrigeration means for the blanket-enclosed portion of said chamber, and reel means for rolling up the slack in the inner end portion of the blanket.

4. A refrigerator chamber having a floor and surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, refrigeration means for the blanket-enclosed portion of said chamber, and spreader means carried by the blanket for spreading the same to full width to contact the sides of the chamber and seal the space enclosed by the blanket.

5. A refrigerating chamber having a floor and surrounding walls and a service door at one end, a single flexible blanket of insulating material reaching the full width of said chamber extensible substantially horizontally from the other end of said chamber toward the door end so as to be held by gravity in more or less close relationship to the top of the material to be refrigerated, said blanket also extending down behind said material to the floor, whereby closely to enclose whatever material is present to be refrigerated and thereby enclose only a fraction of the total volume of the chamber which diminishes as material is removed and the blanket is shifted accordingly, and means in the end of said chamber remote from the service door for refrigerating the blanket enclosed portion of said chamber.

6. A refrigerating chamber having surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, a smaller service door closing an opening provided in one side of said chamber at the end remote from the other service door, a plenum chamber and a Dry Ice chamber so arranged with respect to one another and to said smaller service door so that Dry Ice may be entered into the Dry Ice chamber over said plenum chamber when said door is opened, a blower connected with said plenum chamber so as to draw air into the plenum chamber from the lower portion of the blanket enclosed space in heat-exchange contact with the Dry Ice for cooling before discharging the same, and an air circulatory and discharge system built into said blanket receiving cooled air under pressure from said blower and discharging it inwardly from the blanket over the material in the blanket enclosed space.

7. A refrigerator chamber having surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, a smaller service door closing an opening provided in one side of said chamber at the end remote from the other service, door, a plenum chamber and a Dry Ice chamber so arranged with respect to one another and to said smaller service door so that Dry Ice may be entered into the Dry Ice chamber through said plenum chamber when said door is opened, a blower connected with said plenum chamber so as to draw air into the plenum chamber from the lower portion of the blanket-enclosed space in heat-exchange contact with the Dry Ice for cooling before discharging the same, and an air circulatory and discharge system on said blanket receiving cooled air under pressure from said blower and discharging it from the blanket over the material in the blanket-enclosed space, said chamber having a floor having transversely extending slots provided therein in longitudinally spaced relation into any one of which closest to the material the outer end of said blanket is adapted to be entered to seal the blanket enclosed space, and slots in the floor extending longitudinally thereof and communicating with the transversely extending slots.

8. A refrigerator chamber having surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, a smaller service door closing an opening provided in one side of said chamber at the end remote from the other service door, a plenum chamber and a Dry Ice chamber so arranged with respect to one another and to said smaller service door so that Dry Ice may be entered into the Dry Ice chamber through said plenum chamber when said door is opened, a blower connected with said plenum chamber so as to draw air into the plenum chamber from the lower portion of the blanket-enclosed space in heat-exchange contact with the Dry Ice for cooling before discharging the same, an air circulatory and discharge system on said blanket receiving cooled air under pressure from said blower and discharging it from the blanket over the material in the blanket-enclosed space, and reel means for rolling up the slack in the inner end portion of the blanket.

9. A refrigerator chamber having surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, a smaller service door closing an opening provided in one side of said chamber at the end remote from the other service door, a plenum chamber and a Dry Ice chamber so arranged with respect to one another and to said smaller service door so that Dry Ice may be entered into the Dry Ice chamber through said plenum chamber when said door is opened, a blower connected with said plenum chamber so as to draw air into the plenum chamber from the lower portion of the blanket-enclosed space in heat-exchange contact with the Dry Ice for cooling before discharging the same, an air circulatory and discharge system on said blanket receiving cooled air under pressure from said blower and discharging it from the blanket over the material in the blanket-enclosed space, reel means for rolling up the slack in the inner end portion of the blanket, and swingable supports on the wall of said chamber carrying said real means so that the rolled up blanket contacts the wall to form a seal for the blanket enclosed space.

10. A refrigerator chamber having surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, a smaller service door closing an opening provided in one side of said chamber at the end remote from the other service door, a plenum chamber and a Dry Ice chamber so arranged with respect to one another and to said smaller service door so that Dry Ice may be entered into the Dry Ice chamber through said plenum chamber when said door is opened, a blower connected with said plenum chamber so as to draw air into the plenum chamber from the lower portion of the blanket-enclosed space in heat-exchange contact with the Dry Ice for cooling before discharging the same, an air circulatory and discharge system on said blanket receiving cooled air under pressure from said blower and discharging it from the blanket over the material in the blanket-enclosed space, and spreader means carried by the blanket for spreading the same to full width to contact the sides of the chamber and seal the space enclosed by the blanket.

11. A refrigerator chamber having surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, a smaller service door closing an opening provided in one side of said chamber at the end remote from the other service door, a plenum chamber and a Dry Ice chamber so arranged with respect to one another and to said smaller service door so that Dry Ice may be entered into the Dry Ice chamber through said plenum chamber when said door is opened, a blower connected with said plenum chamber so as to draw air into the plenum chamber from the lower portion of the blanket-enclosed space in heat-exchange contact with the Dry Ice for cooling before discharging the same, and an air circulatory and discharge system on said blanket receiving cooled air under pressure from said blower and discharging it from the blanket over the material in the blanket-enclosed space, the air circulatory and discharge system on the blanket including a flexible air supply tube extending from said blower lengthwise of the blanket, a manifold connected with the outer end of said supply tube extending transversely of the outer end of said blanket, and flexible perforated air discharge tubes connected with said manifold in laterally spaced relation and extending lengthwise of the blanket.

12. A refrigerator chamber having surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, a smaller service door closing an opening provided in one side of said chamber at the end remote from the other service door, a plenum chamber and a Dry Ice chamber so arranged with respect to one another and to said smaller service door so that Dry Ice may be entered into the Dry Ice chamber through said plenum chamber when said door is opened, a blower connected with said plenum chamber so as to draw air into the plenum chamber from the lower portion of the blanket-enclosed space in heat-exchange contact with the Dry Ice for cooling before discharging the same, an air circulatory and discharge system on said blanket receiving cooled air under pressure from said blower and discharging it from the blanket over the material in the blanket-enclosed space, the air circulatory and discharge system on the blanket including a flexible air supply tube extending from said blower lengthwise of the blanket, a manifold connected with the outer end of said supply tube extending transversely of the outer end of said blanket, and flexible perforated air discharge tubes connected with said manifold in laterally spaced relation and extending lengthwise of the blanket, and reel means for rolling up the slack in the inner end portion of the blanket.

13. A refrigerator chamber having surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, a smaller service door closing an opening provided in one side of said chamber at the end remote from the other service door, a plenum chamber and a Dry Ice chamber so arranged with respect to one another and to said smaller service door so that Dry Ice may be entered into the Dry Ice chamber through said plenum chamber when said door is opened, a blower connected with said plenum chamber so as to draw air into the plenum chamber from the lower portion of the blanket-enclosed space in heat-exchange contact with the Dry Ice for cooling before discharging the same, an air circulatory and discharge system on said blanket receiving cooled air under pressure from said blower and discharging it from the blanket over the material in the blanket-enclosed space, the air circulatory and discharge system on the blanket including a flexible air supply tube extending from said blower lengthwise of the blanket, a manifold connected with the outer end of said supply tube extending transversely of the outer end of said blanket, and flexible perforated air discharge tubes connected with said manifold in laterally spaced relation and extending lengthwise of the blanket, reel means for rolling up the slack in the inner end portion of the blanket, said reel means serving to roll up the air discharge tubes with the blanket, and other reel means for separately rolling up the air supply tube.

14. A refrigerator chamber having surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, a smaller service door closing an opening provided in one side of said chamber at the end remote from the other service door, a plenum chamber and a Dry Ice chamber so arranged with respect to one another and to said smaller service door so that Dry Ice may be entered into the Dry Ice chamber through said plenum chamber when said door is opened, a blower connected with said plenum chamber so as to draw air into the plenum chamber from the lower portion of the blanket-enclosed space in heat-exchange contact with the Dry Ice for cooling before discharging the same, an air circulatory and discharge system on said blanket receiving cooled air under pressure from said blower and discharging it from the blanket over the material in the blanket-enclosed space, the air circulatory and discharge system on the blanket including a flexible air supply tube extending from said blower lengthwise of the blanket, a manifold connected with the outer end of said supply tube extending transversely of the outer end of said blanket, and flexible perforated air discharge tubes connected with said manifold in laterally spaced relation and extending lengthwise of the blanket, reel means for rolling up the slack in the inner end portion of the blanket, said reel means serving to roll up the air discharge tubes with the blanket, other reel means for separately cooling up the air supply tube, and a cross-bar in said chamber over which the blanket with the air discharge tubes is slidable as reeled up, the air supply tube being below said bar.

15. A refrigerating chamber having surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, refrigeration means for the blanket enclosed portion of said chamber, electrical powered means for drawing air from the lower portion of said blanket enclosed space continuously into cooling contact with said refrigeration means and discharging the cooled air into the upper portion of said blanket enclosed space, and a thermostat for controlling turning on and off of said last mentioned means, said thermostat carried on the inner side of said blanket near the outer end thereof to react always to temperature change in the lower portion of the blanket-enclosed portion of the chamber.

16. A refrigerator chamber having a floor and surrounding walls and a service door at one end, the floor having transversely extending slots provided therein in longitudinally spaced relation, and intersecting longitudinally extending slots communicating with the transversely extending slots, a flexible blanket of insulating material reaching the full width of said chamber and suspended so that the lower end enters one of the transversely extending slots closest to whatever material is present to be refrigerated, whereby to enclose only a fraction of the total volume of the chamber which diminishes as material is removed and the blanket is shifted farther and farther away from the service door, refrigeration means for the blanket-enclosed portion of said chamber, and means in the end of said chamber remote from the service door for drawing air from the lower portion of said blanket-enclosed space continuously into cooling contact with said refrigeration means and discharging the cooled air into the upper portion of said blanket-enclosed space.

17. A refrigerator chamber having a floor and surrounding walls and a service door at one end, the floor having transversely extending slots provided therein in longitudinally spaced relation, and intersecting longitudinally extending slots communicating with the transversely extending slots, a flexible blanket of insulating material reaching the full width of said chamber and suspended so that the lower end enters one of the transversely extending slots closest to whatever material is present to be refrigerated, whereby to enclose only a fraction of the total volume of the chamber which diminishes as material is removed and the blanket is shifted farther and farther away from the service door, a smaller service door closing an opening provided in one side of said chamber at the end remote from the other service door, a plenum chamber and a Dry Ice chamber so arranged with respect to one another and to said smaller service door so that Dry Ice may be entered into the Dry Ice chamber through said plenum chamber when said door is opened, a blower connected with said plenum chamber so as to draw air into the plenum chamber from the lower portion of the blanket-enclosed space in heat-exchange contact with the Dry Ice for cooling before discharging the same, and an air circulatory and discharge system on said blanket receiving cooled air under pressure from said blower and discharging it from the blanket over the material in the blanket-enclosed space.

18. A refrigerator chamber having a floor and surrounding walls and a service door at one end, the floor having transversely extending slots provided therein in longitudinally spaced relation, and intersecting longitudinally extending slots communicating with the transversely extending slots, a flexible blanket of insulating material reaching the full width of said chamber and suspended so that the lower end enters one of the transversely extending slots closest to whatever material is present to be refrigerated, whereby to enclose only a fraction of the total volume of the chamber which diminishes as material is removed and the blanket is shifted farther and farther away from the service door, refrigeration means for the blanket-enclosed portion of said chamber, electrical powered means for drawing air from the lower portion of said blanket-enclosed space continuously into cooling contact with said refrigeration means and discharging the cooled air into the upper portion of said blanket-enclosed space, and a thermostat for controlling turning on and off of said last-mentioned means, said thermostat carried on the inner side of said blanket near the lower end thereof to react always to temperature change in the lower portion of the blanket-enclosed portion of the chamber.

19. A refrigerator chamber having a floor and surrounding walls and a service door at one end, the floor having transversely extending slots provided therein in longitudinally spaced relation, and intersecting longitudinally extending slots communicating with the transversely extending slots, a flexible blanket of insulating material reaching the full width of said chamber and suspended so that the lower end enters one of the transversely extending slots closest to whatever material is present to be refrigerated, whereby to enclose only a fraction of the total volume of the chamber which diminishes as material is removed and the blanket is shifted farther and farther away from the service door, a seal of compressible resilient material on the lower end of said blanket arranged to engage the transversely extending slot to seal off the longitudinally extending slots at the transversely extending slot in each setting of the blanket and accordingly isolate the blanket-enclosed portion of said chamber in front of the blanket from the space behind it, refrigeration means for the blanket-enclosed portion of said chamber, and means in the end of said chamber remote from the service door for drawing air from the lower portion of said blanket-enclosed space continuously into cooling contact with said refrigeration means and discharging the cooled air into the upper portion of said blanket-enclosed space.

20. A refrigerator chamber having a floor and surrounding walls and a service door at one end, the floor having transversely extending slots provided therein in longitudinally spaced relation, and intersecting longitudinally extending slots communicating with the transversely extending slots, a flexible blanket of insulating material reaching the full width of said chamber and suspended so that the lower end enters one of the transversely extending slots closest to whatever material is present to be refrigerated, whereby to enclose only a fraction of the total volume of the chamber which diminishes as material is removed and the blanket is shifted farther and farther away from the service door, refrigeration means, a blower connected with said refrigeration means to draw air from the lower portion of the blanket-enclosed space in heat exchange contact with said refrigeration means for cooling before discharging the air, and an air circulatory and discharge system on said blanket receiving cooled air under pressure from said blower and discharging it from the blanket over the material in the blanket-enclosed space.

21. A refrigerator chamber having surrounding walls and a service door at one end, a flexible blanket of insulating material reaching the full width of said chamber extensible from the other end of said chamber toward the door end closely to enclose whatever material is present to be refrigerated and thereby enclose only a fraction of the total volume of the chamber which diminishes as material is removed and the blanket is shifted accordingly, refrigeration means, a blower connected with said refrigeration means to draw air from the lower portion of the blanket-enclosed space in heat exchange contact with the refrigeration means for cooling before discharging the air, and an air circulatory and discharge system built into said blanket receiving cooled air under pressure from said blower and discharging it inwardly from the blanket over the material in the blanket-enclosed space.

22. The combination set forth in claim 21 including reel means for rolling up the slack in the inner end portion of the blanket.

23. The combination set forth in claim 21 including reel means for rolling up the slack in the inner end portion of the blanket, and swingable supports on the wall of said chamber carrying said reel means so that the rolled up blanket contacts the wall to form a seal for the blanket-enclosed space.

24. The combination set forth in claim 21 including reel means for rolling up the slack in the inner end portion of the blanket, and spreader means carried by the blanket for spreading the same to full width to contact the sides of the chamber and seal the space enclosed by the blanket.

25. The combination set forth in claim 21 wherein the air circulatory and discharge system on the blanket includes a flexible air supply tube extending from said blower lengthwise of the blanket, a manifold connected with the outer end of said supply tube extending transversely of the outer end of said blanket, and flexible perforated air discharge tubes connected with said manifold in laterally spaced relation and extending lengthwise of the blanket.

26. The combination set forth in claim 21 wherein the air circulatory and discharge system on the blanket includes a flexible air supply tube extending from said blower lengthwise of the blanket, a manifold connected with the outer end of said supply tube extending transversely of the outer end of said blanket, and flexible perforated air discharge tubes connected with said manifold in laterally spaced relation and extending lengthwise of the blanket.

27. The combination set forth in claim 21 wherein the air circulatory and discharge system on the blanket includes a flexible air supply tube extending from said blower lengthwise of the blanket, a manifold connected with the outer end of said supply tube extending transversely of the outer end of said blanket, and flexible perforated air discharge tubes connected with said manifold in laterally spaced relation and extending lengthwise of the blanket, reel means for rolling up the slack in the inner end portion of the blanket, said reel means serving to roll up the air discharge tubes with the blanket, and other reel means for separately rolling up the air supply tube.

References Cited in the file of this patent

UNITED STATES PATENTS

| | | |
|---|---|---|
| 1,833,034 | Parker | Nov. 24, 1931 |
| 2,093,834 | Gaugler | Sept. 21, 1937 |
| 2,297,970 | Merz | Oct. 6, 1942 |
| 2,588,189 | Wilson | Mar. 4, 1952 |
| 2,633,714 | Wehby | Apr. 7, 1953 |